United States Patent Office 3,772,388
Patented Nov. 13, 1973

3,772,388
PROCESS FOR ELIMINATING INSOLUBLE RESIDUES FORMED DURING THE PRODUCTION OF ADIPONITRILE BY DIMERIZATION
Henri Lefebvre, Cite de la Taille 48, B–5790, Jemeppe-sur-Sambre, Belgium, and Jacques Van Bost, Rue la Haie le Comte 19, B–5001, Belgrade, Belgium
No Drawing. Filed May 24, 1971, Ser. No. 146,430
Claims priority, application France, May 27, 1970, 7019480
Int. Cl. C07c 121/02, 121/26
U.S. Cl. 260—465.8 A        5 Claims

ABSTRACT OF THE DISCLOSURE

The insoluble deposition formed during the production of adiponitrile by the dimerization of a β-halogeno-propionitrile and/or acrylonitrile are eliminated by treatment with an aqueous solution of hydrogen peroxide.

BACKGROUND OF THE INVENTION

The present invention relates to a process for the elimination of insoluble by-products formed in the course of the production of adiponitrile by dehalogenating dimerization of a β-halogenated propionitrile and also by hydrodimerization of acrylonitrile on an amalgam, after neutralization by an acid of the alkali produced as a by-product in the course of the hydrodimerization, or else by electrolytic dimerization of acrylonitrile.

The process of the invention is particularly applicable to installations intended for the dehalogenating dimerization of a β-halogenated propionitrile on an amalgam in the presence of specific solvents, as described in U.S. Pat. No. 3,536,747, granted on Oct. 27, 1970 to Mathis and Vanmelkebeke, and British Pat. No. 1,217,996 of March 1969.

It is also applicable to the hydrogenating dimerization of acrylonitrile to form adiponitrile, one method for which is described in British Pat. 1,157,443, granted to Imperial Chemical Industries, and also to the electrolytic dimerization of acrylonitrile to form adiponitrile, as described in Belgian Pat. No. 706,573 of Nov. 16, 1967, granted to Asahi Kasei K. K. In these processes, the organic products of the reaction mixture are separated into their various constituents in installations comprising one or more distillation columns.

Canadian Pat. 860,962 of June 8, 1970 and the copending U.S. application, Ser. No. 45,724, filed June 12, 1970, now U.S. Pat. 3,711,078, which together with the previously mentioned patents, are incorporated by reference, teach that the organic products which are impregnated on the alkali or alkaline earth metal salt formed during the dimerization procedure, simultaneously therewith in the dehalogenating dimerization of a β-halogenated propionitrile and after neutralization of the reaction medium with acid in the hydrodimerization of acrylonitrile, may be recovered by washing the salt with propionitrile produced as by-product during the reaction. The organic solutions resulting from this washing may be added to the organic products of the dimerization which are subsequently fractionated.

In order to avoid the decomposition of these organic products as far as possible, the separation is preferably effected under reduced pressure and in two stages. In a first column, the major part of the light products are separated by evaporation under reduced pressure. In a second column which usually contains a filling material for better separation, the heavy products are subjected to rectification under a higher vacuum in order to eliminate the remainder of products lighter than adiponitrile. The residue of this distillation is composed of adiponitrile and heavy tarry products comprising higher oligomers and trimers, from which the adiponitrile is separated by distillation in a subsequent stage.

Nevertheless, the accumulation of insoluble tars and the progressive fouling of the filling material in the rectifying column resulting therefrom cause increasingly high losses of head, with an ultimate reduction of the effectiveness of the column. Consequently, there is a risk that an increasing amount of light products will reach the still and decompose or polymerize therein which is equivalent to reduced production of adiponitrile in relation to the original mononitrile and to contamination of the adiponitrile, which makes hydrogenation very difficult without repurification.

Effective periodic cleaning of the rectifying column is therefore essential.

Numerous attempts to solubilize the residues with the aid of organic solvents of various kinds produced negative results. Dimethylformamide, tetraline, methylene chloride, chloroform, carbon tetrachloride, trichloroethylene, hexane, benzene, toluene, ethyl alcohol, acetone and acrylonitrile are completely incapable of effecting this dissolution. Only dimethyl sulfoxide effects a partial dissolution of the heavy components.

With regard to oxidizing agents, a solution of permanganate has no effect, while sodium hypochlorite gives some results.

SUMMARY OF THE INVENTION

The applicants have now found a simple, effective and inexpensive process for washing the insoluble residues of the adiponitrile rectifying column.

According to the process of the present invention, the insoluble residues present in the rectifying column for adiponitrile produced by dimerization of a halogenated and/or unsaturated nitrile by means of an alkali or alkaline earth metal amalgam or by electrohydrodimerization of acrylonitrile are eliminated by washing with an aqueous solution of hydrogen peroxide.

DESCRIPTION OF THE INVENTION

The concentration of the aqueous solution of hydrogen peroxide is not critical in the process of the invention. Nevertheless, the use of excessively concentrated solutions entails the formation of a fairly abundant foam, which is sometimes difficult to dispose of. It is therefore preferable to avoid this disadvantage by using dilute solutions of hydrogen peroxide for washing the rectifying column. The use of such solutions naturally lengthens the treatment time. For this reason, it is advantageous to operate at elevated temperature in order to accelerate the process. By increasing the temperature of the aqueous solution of hydrogen peroxide to about boiling temperature, excellent results are obtained with solutions containing 5 to 10% by weight of hydrogen peroxide.

The elimination of the insoluble residues in a rectifying column for adiponitrile which has been produced by dimerization of a halogenated and/or unsaturated nitrile or by electrohydrodimerization of acrylonitrile is thus preferably effected with an aqueous solution containing about 5 to 10% by weight of hydrogen peroxide which is brought to a temperature ranging approximately from 80 to 100° C.

The total volume of aqueous hydrogen peroxide solution required to eliminate all of the insoluble residue depends of course on the amount of residue accumulated in the rectifying column. However, a molar excess is generally used and in any event a sufficient amount of hydogen peroxide should be used to totally decompose all of the residue.

According to a preferred embodiment of the invention, the column is filled up to the top with the hydrogen peroxide solution which is then brought into a temperature of about 80° to 100° C. Once the decomposition has started, the exothermic reaction generally generates sufficient heat to maintain the temperature at the desired level.

The column is drained after decomposition of the hydrogen peroxide is completed and after carbon monoxide or carbon dioxide is no longer generated. The end of the decomposition of hydrogen peroxide can easily be checked, for example, by potassium iodide titration of a sample.

The condition of cleanliness of the rectifying column can then be observed visually and if necessary, a further treatment with a fresh hydrogen peroxide solution can be effected.

The following example further illustrates the best mode currently contemplated for carrying out the present invention, but it must not be construed as limiting the invention in any manner.

Example

This example concerns the rectification of a mixture having a high adiponitrile content produced by the dechlorinating dimerization of β-chloropropionitrile with a sodium amalgam in the presence of dimethyl sulfoxide, in accordance with the example of the aforesaid Canadian Pat. 860,962.

The broth continuously removed from the dimerizer contains acrylonitrile, propionitrile, β-chloropropionitrile, and adiponitrile, water, dimethyl sulfoxide, and finally various trimers and impurities. After draining and washing the salt with propionitrile, the washing liquid and the organic phase separated from the broth are passed to a rising film evaporator operating under reduced pressure, from which almost all the so-called light products are separated, namely acrylonitrile, β-chloropropionitrile, and propionitrile and the water together with part of the dimethyl sulfoxide.

The liquid phase leaving the evaporator is composed essentially of adiponitrile, the remainder of the dimethyl sulfoxide, and the heavy products. The crude adiponitrile is then freed from the residue of solvent in a rectifying column provided with filling bodies and operating under a higher vacuum. It is in this column that the insoluble tars accumulate, so that an effective periodic washing is essential.

The effectiveness of the washing of the rectifying column with the aid of an aqueous solution containing 5% by weight of hydrogen peroxide at 100° C. is shown below by the reduction of losses of head resulting therefrom (see Table 1, second column).

TABLE 1

| | Fouled column | Column after cleaning |
|---|---|---|
| Pressure at top of column, mm. Hg | 5 | 5 |
| Temperature at kettle, ° C | 157.7 | 160 |
| Temperature at top of column, ° C | 62.5 | 62.6 |
| Feed flow, kg./h | 10 | 10 |
| Dimethyl sulfoxide content, percent mol in— | | |
| Feed mixture | 34.5 | 32.7 |
| Distillate | 98.9 | 98.5 |
| Distillation residue | 1.77 | 0.22 |
| Number of theoretical plates | 2.80 | 3.72 |
| Losses of head in column, mm. H₂O | 182 | 10.1 |
| HETP (height equivalent theoretical plate) | 1.43±0.03 | 1.08±0.05 |

What we claim as new and desire to secure by Letters Patent is:

1. A process for eliminating insoluble depositions comprising polymers and degradation products present in the rectifying column for adiponitrile, said adiponitrile being produced by dehalogenating dimerization of a β-halogenated propionitrile by means of an alkali or alkaline earth metal amalgam, wherein the crude dimerization reaction mixture contains adiponitrile product, organic components lower boiling than said adiponitrile and said polymers and degradation products, and wherein said adiponitrile is freed from said lower boiling organic component in said rectifying column and said insoluble depositions accumulate therein, which process comprises washing said rectifying column with an aqueous solution of hydrogen peroxide to remove said depositions.

2. A process according to claim 1 in which the major part of said lower boiling components has been separated from said adiponitrile previously and in said rectifying column said adiponitrile is freed from remaining lower boiling components.

3. A process according to claim 1 in which said depositions are removed by washing with an aqueous solution containing 5 to 10% by weight of hydrogen peroxide at a temperature of approximately 80–100° C.

4. In a process for treating the crude mixture resulting from the dehalogenating dimerization of a β-halogenated propionitrile by means of an alkali or alkaline earth metal amalgam, said crude mixture comprising an organic liquid phase containing adiponitrile product, propionitrile by-product, polymers and degradation products and a solid alkali metal or alkaline earth metal salt, wherein said process comprises separating said crude mixture into said organic liquid phase and a solid phase comprised of said salt, distilling said organic liquid phase to separate and recover said adiponitrile product and said propionitrile by-product, washing said solid phase in order to recover the liquid organic products which are impregnated on said solid phase by means of a washing liquid consisting of said propionitrile by-product which has been separated and recovered and adding the liquid recovered from said washing to said organic liquid phase prior to said distilling, and wherein said distilling is effected under reduced pressure in two steps comprising (1) separating a fraction comprising most of said propionitrile by-product and a fraction comprising most of said adiponitrile product and (2) separating remaining propionitrile from said adiponitrile product from said fraction comprising most of said adiponitrile product in a column in order to recycle the thus obtained fractions of propionitrile to the washing and to isolate the adiponitrile product, whereby said polymers and degradation products accumulate as insoluble depositions in said column, the improvement which comprises washing the column where adiponitrile product is isolated with an aqueous solution of hydrogen peroxide to remove therefrom said insoluble depositions comprising said polymers and degradation products.

5. Process according to claim 4 in which said column is washed with an aqueous solution containing 5 to 10% by weight of hydrogen peroxide at a temperature of approximately 80 to 100° C.

No references cited

JOSEPH PAUL BRUST, Primary Examiner

U.S. Cl. X.R.
204—72; 260—465.8 R, 465.8 D